United States Patent [19]

Aubrey

[11] Patent Number: 5,716,125

[45] Date of Patent: Feb. 10, 1998

[54] FLUORESCENT RETROFIT LIGHT FIXTURE

[76] Inventor: Truman R. Aubrey, 1472 Beaudry Blvd., Glendale, Calif. 91208

[21] Appl. No.: 551,740

[22] Filed: Nov. 1, 1995

[51] Int. Cl.⁶ .................................................. F21V 21/04
[52] U.S. Cl. .................................. 362/260; 362/364
[58] Field of Search ............................ 362/263, 260, 362/147, 364

[56] References Cited

U.S. PATENT DOCUMENTS

| 3,660,651 | 5/1972 | Miles, Jr. | |
| 4,232,361 | 11/1980 | Kelsall | 362/364 |
| 4,327,402 | 4/1982 | Aubrey | 362/288 |
| 4,520,436 | 5/1985 | McNair et al. | 362/366 |
| 4,595,969 | 6/1986 | McNair | 362/217 |
| 4,704,664 | 11/1987 | McNair | 362/225 |
| 5,073,845 | 12/1991 | Aubrey | 362/260 |
| 5,398,178 | 3/1995 | Roth | 362/296 |
| 5,440,471 | 8/1995 | Zadeh | 362/364 |
| 5,580,158 | 12/1996 | Aubrey et al. | 362/263 |
| 5,584,575 | 12/1996 | Fickel | 362/260 |

*Primary Examiner*—Ira S. Lazarus
*Assistant Examiner*—Sara Sachie Raab
*Attorney, Agent, or Firm*—G. Donald Weber, Jr.

[57] ABSTRACT

A retrofit assembly for readily and inexpensively converting an incandescent light fixture to a fluorescent light fixture.

19 Claims, 1 Drawing Sheet

FLUORESCENT RETROFIT LIGHT FIXTURE

BACKGROUND

1. Field of the Invention

This invention is directed to light fixtures, in general, and, more particularly, to a light fixture which is readily converted from operation with a conventional incandescent light source to operation with a fluorescent, metal halide, high pressure sodium or similar light source which uses a ballast.

2. Prior Art.

There are many types of light fixtures which are known in the art. These include recessed fixtures, surface mounted fixtures, track-light fixtures and the like. Most of the known light fixtures use incandescent light sources therein. However, incandescent light sources have a relatively short life and are inefficient. The number of lumens generated per electrical watt consumed is not economical, i.e. generally in the range of 14 to 17 lumens per watt.

In addition, these types of light sources generally use a thin filament which glows when heated by electrical power. The filament tends to burn out or break rather easily.

Also, incandescent light sources tend to generate a large amount of heat which is given off into the surrounding area. This has the secondary shortcoming of producing heat in many places where excessive heat is not desired. Consequently, it becomes necessary to use air conditioning equipment or the like to counteract this unwanted heat. Consequently, incandescent light sources tend to be energy consumers and/or wasters.

Several types of alternative light sources are known in the art. For example, fluorescent, high pressure sodium and metal halide lamps are typical. These light sources generally tend to operate quite efficently and provide 50 to 120 lumens per watt. The lower wattages do not, as a rule, produce excess heat during operation.

However, these alternative light sources are normally not interchangeable with incandescent light sources. For one thing, the different light sources (also referred to as bulbs or tubes) may have different couplings, as is the case with fluorescent tubes or bulbs. The "Edison-base" coupling which is common on the ordinary incandescent lamp and complementary light fixture will not accept standard fluorescent lamp fittings. Although single-ended, high pressure sodium and metal halide lamps can often be screwed into an Edison-base socket, they cannot be successfully operated because all arc discharge lamps usually require a ballast to operate the lamp. Since the ballast may be relatively large, it usually cannot be mounted within the interior of the existing fixture.

In order to convert an existing, inefficient incandescent lighting system to a more efficient light source, it has been necessary to replace the existing light fixture with a totally new light fixture that incorporates the proper socket configuration and ballast assembly in the new fixture.

Certain retrofit light fixtures were developed which include ballasts built right into the fixture itself or an attached housing. These light fixtures, however, required an ample amount of space within the existing fixture to have the ballast and socket assemblies.

Consequently, it is highly desirable to develop retrofit light fixture systems which permit these alternative light sources to be retrofitted into existing electrical system hardware efficiently and economically.

PRIOR ART STATEMENT

The most pertinent prior art known to applicant is listed herewith in patent number order. No special significance is given to any particular patent or to any prior art not known to applicant.

U.S. Pat. No. 4,327,402; LIGHT FIXTURE; T. Aubrey. This patent is directed to an adjustable, retro-fit fluorescent light fixture with a telescoping adjustment mechanism.

U.S. Pat. No. 3,660,651; ADJUSTABLE LIGHT FIXTURE; E. Miles, Jr. This patent is directed to an adjustable light fixture using a pair of levered arms to adjust the position of the lamp.

U.S. Pat. No. 4,232,361; ADJUSTABLE LIGHT FIXTURE; J. Kelsall. This patent is directed to an adjustable light fixture with a plurality of resilient tracks for adjusting the position of the light fixture.

U.S. Pat. No. 4,520,436; LAMP APPARATUS; R. McNair et al. This patent is directed to a lamp apparatus which includes a reflector and an integral trim ring.

U.S. Pat. No. 4,595,969; LAMP MOUNTING APPARATUS AND METHOD; R. McNair. This patent is directed to a retro-fit lamp fixture using a plastic strap with a "gripper" which is connected to and slidable along the strap.

U.S. Pat. No. 4,704,664; LAMP APPARATUS; R. McNair. This patent is directed to substantially the same device as the U.S. Pat. No. 4,520,436 with the addition of a cover to enclose the ballast and sockets.

SUMMARY OF THE INVENTION

This invention is related to a retrofit lighting fixture wherein incandescent or other types of inefficient light sources are replaced by fluorescent, high pressure sodium or metal halide light sources. One of the important aspects of this type of device is the use of an in-line ballast. That is, the ballast is mounted directly into the supply line of the existing light fixture. Another aspect of the invention is that it allows the use of arc discharge lamps that require a ballast with the ballast connected directly into the supply line. Also, the fluorescent, high pressure sodium light sources can be used with threaded reflectors, separate mounting bases and the like, in order to enhance the retrofit efficiency and desirability. The present invention can be installed with the light fixture in place without a major remodeling requirement.

DESCRIPTION OF A PREFERRED EMBODIMENT

Figure 1:
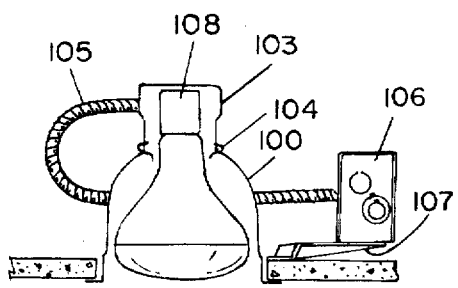
FIG. 1 is a schematic illustration of a light fixture known in the prior art.

Referring now to FIG. 1, there is shown a schematic, partially broken away illustration of a light fixture known in the prior art. In this illustration, a typical reflector assembly 100 of a recessed fixture is mounted in a conventional opening in a ceiling 101. The reflector assembly is attached to, socket cup 103 which includes a female threaded Edison socket 108 which accepts a threaded-base incandescent light bulb (or other screw base lamp).

Althought the reflector assembly can be any suitable two piece assembly as described above, the preferred embodiment is an architectural downlight two-piece socket cup/clip-on reflector assembly such as a "Calculite, or Lytecaster Series manufactured by Lightolier, a 500 or 600 Series by Halo, LP Advantage Series by Lithonia or like two piece design a other manufacturers.

The reflector 100 is retained in place by any suitable arrangement including (but not limited to) a spring loaded trim ring 102 or the like. A socket cup 103 is mounted to the metal reflector assembly 100 by means of a suitable spring clip 104 or the like.

A flex conduit 105 is connected from the socket cup 103 to a suitable wiring box 106. In a typical arrangement, the wiring box 106 is mounted on the mounting plate 107 (or a support beam therefor) for installation into the ceiling 101.

In the assembly shown, the conduit 105 is connected to the cup 103 and the standard Edison-type socket 108 mounted therein. A standard incandescent bulb 109 which may include a reflector glass of conventional design is, typically, inserted into the cup 103.

In this arrangement which is known in the art, the incandescent light source 109 provides an illumination into a room or other similar area. The reflector 100 enhances the light distribution. However, as noted, the light source 109 is an incandescent type bulb which generates substantial amounts of heat as well as requiring substantial amounts of power to activate same.

It is frequently desirable to replace the incandescent light bulb 109 with a fluorescent or high pressure sodium (HPS) light source, in order to effect the advantages of lower power requirements and reduced heat generation. However, to permit this replacement, a ballast is required. In the past, this replacment has, typically, required the removal and replacement of the entire light fixture including the reflector 100, the socket 108, the socket cup 103 and so forth. This removal and replacement can be expensive and it can cause damage to the existing structure such as a ceiling, a wall or the like.

Figure 2:
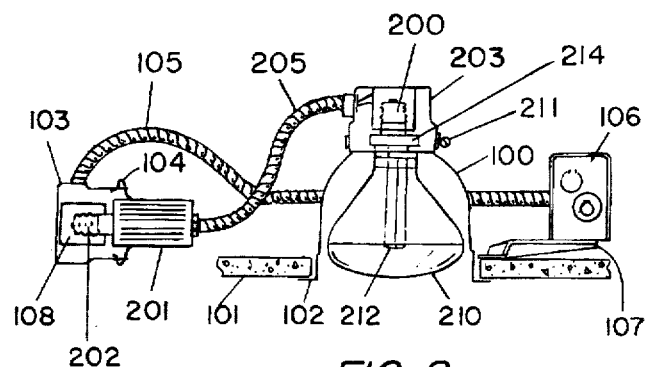
FIG. 2 is a schematic illustration of one embodiment of the instant invention.

Referring now to FIG. 2, there is shown a replacement apparatus which enhances the replacement of the incandescent light source with a fluorescent or HPS light source without any significant modification to the existing structure. In FIG. 2, components which are similar to those shown in FIG. 1 bear similar reference numerals. Thus, the reflector 100 remains attached to the ceiling or structure 101 by means of the trim clips 102 or the like. The wiring box 106 remains affixed to the structure by means of bracket 107. The flex conduit 105 remains connected to the socket cup 103 which, typically, retains the Edison socket 108.

However, the instant invention utilizes a ballast unit 201 which includes a screw base 202 which mounts into the Edison socket 108. The Edison screw base 202 is attached to one end of the ballast housing 201. The other end of the ballast 201 is connected to the flex conduit 205 which is substantially similar in construction to the flex conduit 105. The flex conduit 205 is connected to a socket cup 203 which is adapted to include a socket 208 which is similar to the Edison socket 108. The metal or aluminized glass reflector 210 is attached to a fluorescent or HSP socket assembly with male/female threads, fasteners, clips or the like. A light source 212 (in this instance a fluorescent lamp is shown) is mounted in the adapter 214 which is threadedly engaged with the socket 208.

Of course, if a light source 212 is an HPS source, the adapter 214 may not be required. Alternatively, the fluorescent or HPS socket assembly may be inserted directly into the cup 203 instead of the Edison socket 108. In this case, an adapter 214 is not required.

In order to replace the assembly shown in FIG. 1 with the assembly shown in FIG. 2, it is very simple to follow the steps of first removing the existing reflector assembly 101 by grasping the lip of the reflector or the trim 102 and pulling the reflector. downwardly through the opening in the ceiling 101. This may require some twisting or rotation of the assembly depending upon the reflector assembly 101 used.

Once the reflector assembly is pulled downwardly through the opening, the socket cup 103 is exposed and removed from the end of the reflector. Typically, this is accomplished by unfastening the clips 104.

The ballast 201 and the attached Edison base 202 are then engaged with the socket 108 in the socket cup 103. That is, the threaded base 202 of the ballast 201 is threaded into the socket 108 in a conventional manner.

The new socket cup 203 is then attached to the neck of the reflector assembly 100 and fastened thereto by any suitable means as described hereinafter.

The ballast assembly 201 and the cup assembly 103 (together with the flexible conduits 105 and 205) are then pushed upwardly through the opening in the ceiling 101 into the plenum space thereabove. The reflector assembly 100 and reflector trim 102 are then replaced in the opening in the ceiling 101 to the original position. Thus, the retrofitted assembly is now in place.

The light source 212 is then placed into the socket 208 (with or without the adapter 214, depending upon the type of light source utilized).

Thus, the light source 100 assembly has been converted from incandescent to fluorescent or HPS without any significant renovation to the structure in which the light fixture is mounted. In fact, while not recommended, the retrofit installation can be accomplished without turning off power and with few, if any, tools required.

Figure 3:
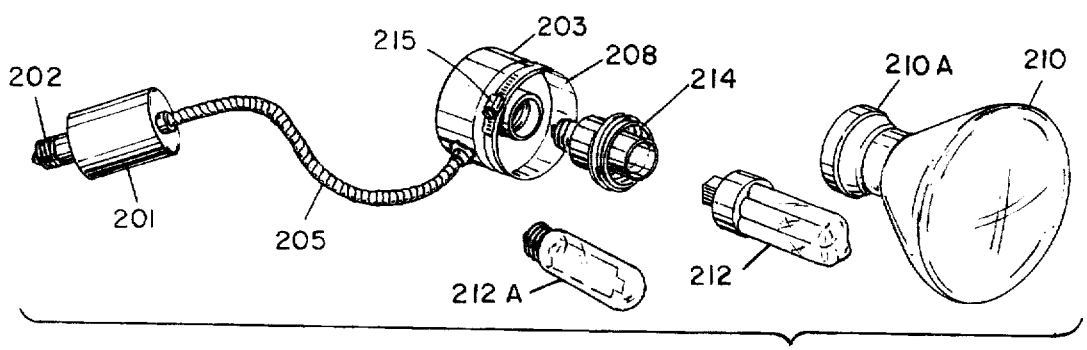
FIG. 3 is an exploded view of a preferred embodiment of the instant invention.

Referring now to FIG. 3, there is shown an exploded view of the apparatus of the instant invention. The assembly includes the base 202 which is a medium ratchet base which is adapted to engage the standard Edison socket. The ballast 201 is, typically, a magnetic core and coil which is potted with silica sand potting compound within a ballast housing of extruded aluminum. Of course, the ballast may also be electronic as is available in the industry.

The flex conduit 205 is standard or conventional. In a typical application of the invention, the flex conduit has a length of approximately 15 inches so that there is sufficient flexibility in the replacement without utilizing an excess amount of such conduit.

The conduit 205 is connected to the socket cup 203 which is, typically, fabricated of deep drawn aluminum. In a typical application, the cup 203 incudes set screws or the like to attach the existing reflector 100 thereto.

The lamp socket 208 is preferably fabricated of an injection molded, polycarbonate, thermoplastic material with the appropriate brass or other electrically conductive metallic threads included therein.

The reflector glass 210 is conventional and frequently comprises an aluminized glass reflector with appropriate aluminum threads 210A which grip the socket 203. The glass reflector 210 and the threads 210A are conveniently joined together by a high temperature cement which bonds the metal and glass, for example. Alternatively, the reflector 210 may be constructed of metal or plastic.

An adapter 214 is provided for use with the fluorescent adapter socket or an HPS adapter socket. A representative adapter 214 is shown. Of course, other adapters can be utilized. As noted above, the adapter 214 may be omitted in some applications in which a different socket assembly is hardwired into cup 203.

The light sources comprise fluorescent lamp 212 or white HPS lamp 212A, for example. While both types of lamps are shown, only one would be included in the particular assembly.

While the "glass", i.e. the aluminized reflector 210 and the light sources or lamps 212 and/or 212A are conventional, it is pointed out that the remainder of the invention is pertinent to utilization of these conventional devices in a retrofit to another portion of a conventional light fixture assembly.

In addition, a clamp 215 is provided to secure the existing reflector 100 to the cup 203. The clamp 215 is shown as a hose clamp or the like. This clamp is adapted to selectively secure the socket 203 to the reflector 100 by appropriately tightening clamp 215.

Of course, as suggested supra, thumb screws, set screws or other suitable clamps can be utilized.

Figure 4:
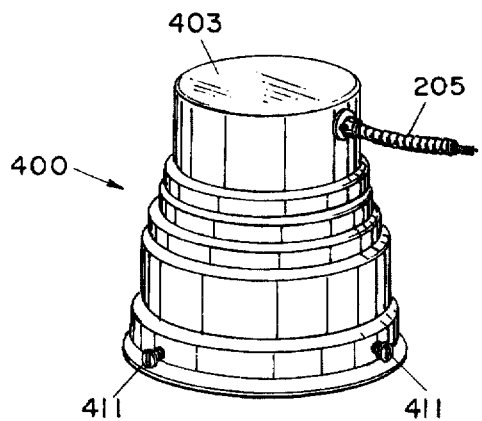
FIG. 4 is a perspective view of an improved socket cup for use with the instant invention.

Referring now to FIG. 4, there is shown a novel design for the retention cup 400. The cup 400 is adapted to replace the socket cup 203 shown in FIG. 3. It is seen that the cup 400 includes a base cup 403 into which the socket 208 is mounted and connected to the flex conduit 205. The cup 400 includes a plurality of sections of increased diameter in a stepped arrangement. The cup 400 is, therefore, capable of accomodating different size reflectors which are produced by various manufacturers. Thus, the retro-fit operation is simplified.

As shown in FIG. 4, the cup 400 is adapted to be connected to a reflector assembly by set screws 411 which replace the hose clamp or the thumb screw described above. While only two such set screws or thumb screws 411 are shown, it should be understood that three or more are preferable.

Thus, there is shown and described a unique design and concept of fluorescent retrofit light fixture. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A light fixture converter including, receptacle means, adapter means coupled to said receptacle means for receiving a light source means and making electrical contact between said receptacle means and the light source means, attachment means for selectively attaching reflector means to said receptacle means, ballast means electrically connected to said receptacle means by elongated flexible electrical conductor means, and threaded base means attached to said ballast means for selective engagement with a conventional threaded socket means in an existing light fixture.

2. The converter recited in claim 1 wherein, said reflector means includes a glass reflector.

3. The converter recited in claim 1 wherein, said flexible electrical conductor means comprises electrical conduit.

4. The converter recited in claim 1 wherein, said receptacle means includes a cup with a plurality of different radius sections therein.

5. The converter recited in claim 1 wherein, said attachment means comprises a clamp means.

6. The converter recited in claim 1 wherein, said attachment means comprises at least one thread means.

7. The converter recited in claim 1 wherein, said light source means is any one of the class comprising fluorescent lamps and high pressure sodium lamps.

8. The converter recited in claim 1 wherein, said receptacle means includes a cup with a plurality of different radius sections therein.

9. A light fixture including, first receptacle means including a conventional threaded socket for selectively receiving an electrical component means with a conventional screw base, second receptacle means including a socket for receiving a light source means, ballast means, ballast housing means with a screw base integrally attached thereto for engagement with said threaded socket in said first receptacle means, said ballast means contained within said ballast housing means, and flexible conductor means connecting said ballast means to said socket in said second receptacle means.

10. The light fixture recited in claim 9 including, adapter means for providing connections between said socket in said second receptacle means and said light source means.

11. The light fixture recited in claim 10 wherein, said reflector means and said adapter means are adapted to be selectively connected to each other.

12. The light fixture recited in claim 9 including, reflector means adapted to substantially enclose said light source means.

13. The light fixture recited in claim 9 wherein, said light source means comprises a fluorescent light lamp.

14. The light fixture recited in claim 9 including, adapter means for providing connections between said socket in said second receptacle means and said light source means, and reflector means adapted to substantially enclose said light source means.

15. A light fixture for retrofitting a downlight with a two-piece socket cup/clip-on reflector system including, receptacle means for receiving a light source means and making electrical contact therewith, reflector means selectively attached to said receptacle means to enclose said light source means, ballast means electrically connected to said receptacle means by elongated flexible electrical conductor means, and threaded base means integrally formed with said ballast means for selective engagement with a conventional threaded socket means in an existing light fixture.

16. The converter recited in claim 15 including, adapter means coupled to said receptacle means to receive light source means to be received thereby.

17. The converter recited in claim 15 wherein,
said reflector means includes a glass reflector.

18. The converter recited in claim 15 wherein,
said flexible electrical conductor means comprises electrical conduit.

19. A light fixture including, first receptacle means including a conventional threaded socket for selectively receiving an electrical component means with a conventional screw base, second receptacle means including a socket for receiving a light source means, ballast means with a screw base attached thereto for engagement with said threaded socket in said first receptacle means, flexible conductor means connecting said ballast means to said socket in said second receptacle means, adapter means for providing connections between said socket in said second receptacle means and said light source means, and reflector means adapted to be connected to said adapter means to substantially enclose said light source means.

* * * * *